(12) United States Patent
Velev et al.

(10) Patent No.: US 8,391,242 B2
(45) Date of Patent: Mar. 5, 2013

(54) ROUTE OPTIMIZATION CONTINUITY AT HANDOVER FROM NETWORK-BASED TO HOST-BASED MOBILITY

(75) Inventors: Genadi Velev, Langen (DE); Kilian Weniger, Langen (DE)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 12/740,618

(22) PCT Filed: Oct. 31, 2008

(86) PCT No.: PCT/EP2008/009228
§ 371 (c)(1),
(2), (4) Date: Jul. 7, 2010

(87) PCT Pub. No.: WO2009/059727
PCT Pub. Date: May 14, 2009

(65) Prior Publication Data
US 2010/0272062 A1    Oct. 28, 2010

(30) Foreign Application Priority Data
Nov. 9, 2007 (EP) .................................... 07021790

(51) Int. Cl.
*H04W 4/00* (2009.01)
*H04L 12/28* (2006.01)
*G06F 15/173* (2006.01)

(52) U.S. Cl. ........ 370/331; 370/329; 370/389; 370/401; 709/239; 709/242

(58) Field of Classification Search .......... 370/328–552; 713/158; 455/436; 709/221–245
See application file for complete search history.

(56) References Cited

U.S. PATENT DOCUMENTS

| 6,636,498 | B1* | 10/2003 | Leung ............................. | 370/338 |
|---|---|---|---|---|
| 8,139,538 | B1* | 3/2012 | Patel et al. .................... | 370/331 |
| 2003/0211842 | A1* | 11/2003 | Kempf et al. ................. | 455/411 |
| 2007/0113075 | A1* | 5/2007 | Jo et al. ......................... | 713/158 |
| 2009/0147751 | A1* | 6/2009 | Gurusamy et al. ............ | 370/331 |

OTHER PUBLICATIONS

International Search Report dated Feb. 5, 2009.
European Search Report dated May 29, 2008.
C. Perkins, et al., "Route Optimization in Mobile IP draft-ietf-mobileip-optim-10.txt," Mobile IP Working Group, Internet Draft, Nov. 15, 2000, Expires May 15, 2001, pp. i-ii, 1-25.
V. Narayanan, et al., "IP Mobility and Multi-homing Interactions and Architectural Considerations draft-vidya-ip-mobility-multihoming-interactions-01," Network Working Group, Internet-Draft, Jul. 5, 2007, Expires Jan. 6, 2008, pp. 1-37.

(Continued)

Primary Examiner — Afsar M. Qureshi
(74) Attorney, Agent, or Firm — Dickinson Wright PLLC

(57) ABSTRACT

A method, mobile node (MN), home agent and system for handover of a MN from a first access network supporting network-based mobility to a second access network not supporting network-based mobility in a packet switched communication network including at least the MN, a mobile access gateway (MAG), a correspondent node and a home agent. The method includes performing proxy route optimization towards the correspondent node by the MAG on behalf of the MN. Handover from the first access network to the second access network is performed when the MN moves out of the first access network. A determination is made as to whether the proxy route optimization is to be maintained after the handover, and if so, information regarding the proxy route optimization is sent to the MN by the home agent.

14 Claims, 10 Drawing Sheets

OTHER PUBLICATIONS

G. Giaretta, et al., "Network-based localized mobility management (NETLMM) with distributed anchor routers <draft-giaretta-netlmm-protocol-00.txt>," NETLMM BOF, Internet Draft, Oct. 14, 2005, Expires Apr. 14, 2006, pp. 1-39.

A. Qin, et al., "PMIPv6 Route Optimization Protocol draft-qin-mipshop-pmipro-00.txt," Network Working Group, Internet-Draft, Feb. 25, 2007, Expires Aug. 29, 2007, pp. 1-24.

D. Johnson, et al., "Mobility Support in IPv6," Network Working Group, Request for Comments: 3775, Category: Standards Track, Jun. 2004, pp. 1-165.

S. Gundavelli, et al., " Proxy Mobile IPv6," Network Working Group, Request for Comments: 5213, Category: Standards Track, Aug. 2008, pp. 1-92.

K. Leung, et al., "Mobility Management using Proxy Mobile IPv4 draft-leung-mip4-proxy-mode-02.txt," MIP4, Internet-Draft, Intended status: Standards Track, Jan. 10, 2007, Expires Jul. 14, 2007, pp. 1-16.

B. Aboba, et al., "The Network Access Identifier," Network Working Group, Request for Comments: 4282, Obsoletes: 2486, Category: Standards Track, Dec. 2005, pp. 1-16.

B. Aboba, et al., "Extensible Authentication Protocol (EAP)," Network Working Group, Request for Comments: 3748, Obsoletes: 2284, Category: Standards Track, Jun. 2004, pp. 1-67.

J. Arkko, et al., "Extensible Authentication Protocol Method for $3^{rd}$ Generation Authentication and Key Agreement (EAP-AKA)," Network Working Group, Request for Comments: 4187, Category: Informational, Jan. 2006, pp. 1-79.

J. Arkko, et al., "Enhanced Route Optimization for Mobile IPv6," Network Working Group, Request for Comments: 4866, Category: Standards Track, May 2007, pp. 1-54.

T. Aura, "Cryptographically Generated Addresses (CGA)," Network Working Group, Request for Comments: 3972, Category: Standards Track, Mar. 2005, pp. 1-22.

B. Sarikaya, et al., "PMIPv6 Route Optimization Protocol draft-qin-netlmm-pmipro-00.txt," Network Working Group, Internet-Draft, Feb. 11, 2008, Expires Aug. 14, 2008, pp. 1-23.

M. Liebsch, et al., "Route Optimization for Proxy Mobile IPv6 draft-abeille-netlmm-proxymip6ro-01.txt," Net LMM Working Group, Internet-Draft, Nov. 13, 2007, Expires May 16, 2008, pp. 1-23.

R. Koodli, et al., "Local Forwarding in Proxy Mobile IPv6 draft-koodli-netlmm-local-forwarding-00.txt," NETLMM Working Group, Internet-Draft, Intended status: Standards Track, Jul. 4, 2008, Expires Jan. 5, 2009, pp. 1-10.

A. Dutta, et al., "ProxyMIP Extension for Inter-MAG Route Optimization draft-dutta-netlmm-pmipro-01," NETLMM Working Group, Internet-Draft, Jul. 13, 2008, Expires Jan. 14, 2009, pp. 1-29.

* cited by examiner

ROUTE OPTIMIZATION CONTINUITY AT HANDOVER FROM NETWORK-BASED TO HOST-BASED MOBILITY

CROSS REFERENCE TO RELATED APPLICATIONS

This application is a 371 of PCT/EP2008/009228 filed Oct. 31, 2008, which is based on EP 07021790.6 filed Nov. 9, 2007, the entire contents of each of which are incorporated by reference herein.

FIELD

This invention generally relates to mobile communications and in particular to handover between network-based and host-based mobility.

The invention relates to handover between access network supporting network-based mobility scheme (network-based mobility domain) and access network not supporting network-based mobility scheme (host-based mobility domain).

BACKGROUND

In the following some of the terminology used throughout this application is explained.

MIP (client Mobile IP): a host-based mobility mechanism. The client (host or mobile node, MN) sends registration messages to the home agent (HA) in order to register its new location. The Mobile IP version 6 (MIPv6) protocol is specified in Johnson et al., 2004 (D. Johnson, C. Perkins, J. Arkko, "Mobility Support in IPv6", RFC 3775, June 2004).

PMIP (Proxy Mobile IP): a network-based mobility mechanism based on the Mobile IP protocol. A proxy mobility entity (called Mobile Access Gateway, MAG) sends registration messages on behalf of the MN to the HA in order to register the MN's new location. Since the HA in PMIP is modified to handle the proxy registrations by the MAG, it is called Local Mobility Anchor (LMA). In PMIP mechanism the MN is not involved in the mobility-related procedures. The Proxy MIPv6 protocol (PMIPv6) is an ongoing work and the current specification is described in Gundavelli et al., 2007 (S. Gundavelli, K. Leung, V. Devarapalli, K. Chowdhury, "Proxy Mobile IPv6", RFC5213, August 2008). Please note that within this document the term PMIP has the meaning of network-based, e.g. "PMIP mobility" may be used interchangeably with "network-based mobility".

Binding Update (BU): a registration message sent by a mobile node or respectively MAG to notify the HA or respectively LMA about the new address (i.e. topological location) of the MN. In this invention we differentiate between BUs send by the MN in host-based mobility mechanism, called BU hereinafter, and BUs send by the MAG in network-based mobility mechanism, called PBU (for proxy-BU) in the following. Analogously, a binding update acknowledgement message sent by the host is indicated as BA and binding update acknowledgement message sent by the MAG is indicated as PBA (for proxy-BA).

Keygen token: a keygen token is a number supplied by a CN in the return routability procedure to enable the mobile node to compute the necessary binding management key for authorizing a Binding Update sent to the CN.

Binding cache entry: A Home Agent on the home link maintains a binding cache entry for each mobile node and uses the binding cache entry to route any traffic meant for the mobile node or the mobile network. Usually the binding cache entry binds the home address of a mobile node to its care-of-address. If the mobile node does not have a binding cache entry at the Home Agent, it is neither reachable at its home address nor able to set up new sessions with its home address. A binding cache entry can also exist in a client (e.g. a correspondent node) that is established by another client (e.g. mobile node). The binding cache entry is also described as a routing state because it changes the entries in the routing table.

In the following the co-location of HA and LMA is denoted as HA/LMA.

Communications systems evolve more and more towards an Internet Protocol (IP)-based network. They consist of many interconnected networks, in which speech and data is transmitted from one terminal to another terminal in pieces, so-called packets. Those packets are routed to the destination by routers in a connection-less manner. IP packets consist of IP header and payload information, whereas the IP header comprises, among other things, source and destination IP address. For scalability reasons an IP network uses a hierarchical addressing scheme. Hence, an IP address does not only identify the corresponding terminal, but additionally contains location information about this terminal.

With additional information provided by routing protocols, routers in the network are able to identify the next router towards a specific destination.

If a terminal is mobile, from now on called Mobile Node (MN), and moves between subnets, it must change its IP address to a topologically correct IP address because of the hierarchical addressing scheme of the Internet Protocol (IP). However, since connections on higher-layers such as TCP connections are defined with the IP addresses (and ports) of the communicating nodes, the connection breaks if one of the nodes changes its IP address, e.g., due to movement.

Mobile IPv6 (Johnson et al., 2004) is an IP-based mobility protocol that enables MNs to move between subnets in a manner transparent for higher layers and applications, i.e. without breaking higher-layer connections. Therefore, a MN has two IP addresses configured: a Care-of-Address (CoA) and a Home Address (HoA). The MN's higher layers use the HoA for communication with the communication partner (destination terminal), from now on called Correspondent Node (CN). This address does not change and serves the purpose of identification of the MN. Topologically, it belongs to the Home Network (HN) of the MN. In contrast, the CoA changes on every movement resulting in a subnet change and is used as the locator for the routing infrastructure. Topologically, it belongs to the network the MN is currently visiting. One out of a set of Home Agents (HA) located on the home link maintains a mapping of the MN's CoA to MN's HoA and redirects incoming traffic for the MN to its current location. Reasons for having a set of HAs instead of a single HA are redundancy and load balancing.

Mobile IPv6 (MIPv6) currently defines two modes of operation: bi-directional tunnelling and route optimization. If bi-directional tunnelling is used, data packets sent by the CN and addressed to the HoA of the MN are intercepted by the HA in the HN and tunnelled to CoA of the MN. Data packets sent by the MN are reverse tunnelled to the HA, which decapsulates the packets and sends them to the CN. For this operation, the HA must be informed about the CoA of the MN. Therefore, the MN sends a registration message (in the following called Binding Update message, BU) to the HA. These messages are sent over an IPsec security association and thus are authenticated and integrity protected. In order for the MN to have IPsec association with the HA, the MN needs to perform bootstrapping a-priori. Bootstrapping is the process of obtaining at least the following information: a home address, a home agent address, and a security association with home agent. This information is needed before the MN registers a CoA with the home agent.

Mobile IP is categorized as host-based (or client-based) mobility management, since the mobility-related signalling is between the host (or client) and the HA. Hence, it is sometimes called Client Mobile IP (CMIP).

Another approach targets the IP mobility management in a limited geographical region, it is managed by the network and therefore is transparent to the MN. This approach is referred as network-based localized IP mobility. One main characteristic of network-based mobility is that the access network entities are appropriately configured to detect the MN movement and to exchange information about the current location of the MN, so that the MN does not need to be involved in the mobility process. Therefore the mobility-related signalling over the wireless interface is avoided. Other advantages of the network-based mobility management are less packet overhead over the air, since no MIPv6 encapsulation is needed, and mobility support for simple IP nodes (i.e., non-MIP-capable nodes).

The Internet Engineering Task Force (IETF) organisation is working on such approach for localized mobility management based on the Mobile IP protocol. Since a network entity is acting as a proxy on behalf of the MN, the protocol is called Proxy Mobile IPv6 (PMIPv6). There is a variant for IPv6 called PMIPv6 (Gundavelli et al., 2007) and a variant for IPv4 called PMIPv4 Leung et al., 2007 (K. Leung, G. Dommety, P. Yegani, K. Chowdhury, Mobility Management using Proxy Mobile IPv4, draft-leung-mip4-proxy-mode-02.txt, January 2007).

This invention assumes PMIPv6 as protocol for network-based mobility management, but the invention is not limited to PMIPv6. It may also be applicable to other network-based mobility management protocols such as PMIPv4.

PMIPv6 introduces a new logical entity called Mobile Access Gateway (MAG), which is co-located with the access router (AR) and which sends BU messages on behalf of a MN. These BU messages are marked with a flag, so that they can be identified as Proxy BU (PBU) messages. Furthermore, PBU messages contain a MN identifier (normally a Network Access Identifier, NAI, is used for this purpose) option, a home prefix option, and a timestamp (or alternatively sequence number) option. The NAI option contains the NAI [RFC4282], which has the form of "username@realm" and which is used to identify a MN.

The home prefix option contains the HoA or home prefix of the MN. In the so-called per-MN-prefix addressing model, every MN has a unique home prefix and the MN's global IP address(es) is configured based on this prefix. In cases where the MN has multiple interfaces, it is up to the network operator policy to decide whether to assign the same or different prefixes to the different MN's interfaces.

The timestamp option contains the time the PBU has been sent by the MAG and is used by the Localized Mobility Anchor (LMA) to identify the freshness of the PBU messages. If the PBU doesn't contain the timestamp option, the LMA must fall back to the sequence number scheme, as specified in the MIPv6 (Johnson et al., 2004) protocol sections 5.2.6. and 9.5. The sequence number scheme may be used when there is context transfer mechanism between the previous and new MAGs, so that the current sequence number can be communicated to the new MAG during handover procedure. For the timestamp option there is no requirement for context transfer between the MAGs during handover.

When a MN attaches to a new MAG, it authenticates with the network using the EAP framework [RFC3748] and an EAP method such as EAP-AKA [RFC4187]. The MAG typically acts as pass-through authenticator and forwards the EAP packets to the AAA server/infrastructure related to the MN. The MN may use a NAI as identifier. If the network authentication is successful, the MAG obtains the MN's profile from the AAA server.

The MAG may retrieve the Home Network Prefix (HNP) in several ways. One default way described in the specification (Gundavelli et al. 2007) is the assignment of the HNP by the LMA. In this case the MAG sends a PBU to the LMA requesting a prefix for the MN, as the HNP option in the PBU is left empty. The LMA sends a Proxy Binding Acknowledgement (PBA) back to the MAG containing the HNP.

An alternative method is the assignment of HNP by the AAA server during the authentication process. After a HNP is assigned and known by the MAG, the MAG sends unicast Router Advertisement (RA) to the MN including that prefix. The MN uses the HNP to configure a global unicast IP address. This kind of host IP configuration is known as stateless autoconfiguration.

An example of a signalling flow for PMIPv6 during initial attachment procedure in case of stateless autoconfiguration is shown in FIG. 1. The figure additionally depicts the standard Duplicate Address Detection (DAD) procedure performed by the MN whenever it configures a new IP address. The DAD procedure is performed in order to detect that the IP address is unique on the given IP link.

FIG. 2 shows the signalling flow in case of handover between MAGs within the same PMIP domain. When the MN moves to the area of AR/MAG2, it starts the authentication procedure as described in FIG. 1. After the MAG2 receives the EAP key transport message, it can start the registration process with HA sending PBU [NAI, timestamp]. MAG2 sends a PBU to the LMA in order to register the MN and to retrieve the HNP. The LMA announces the HNP in the PBA to the MAG. The MN starts checking if the current IP configuration is still valid, i.e. MN sends a RS message. AR/MAG2 responds with unicast RA containing the HNP obtained by the LMA. Since the MN receives the same prefix, it concludes that no IP link change has happened and the MN retains its IP configuration that has been configured before the handover. Now the MN has IP connectivity and can send/receive data packets.

The functionality of a HA as defined in RFC3775 is re-used to a large extent, but some changes are necessary to support PMIPv6. Henceforth, a HA as defined in RFC3775 is called just a HA and a home agent as defined in Gundavelli et al., 2007 is called Localized Mobility Anchor (LMA). A scenario is assumed in this invention where the PMIP-HA and a CMIP-HA are co-located (herinforth the CMIP/PMIP-HA is simply called HA/LMA).

Route Optimisation in MIPv6

The MIPv6 protocol comes with a Route Optimization (also abbreviated as RO) scheme that enables a direct MN-CN conversation, i.e. bypassing the Home Agent. Route Optimization requires the mobile node to register its current binding of home address to care-of-address (HoA→CoA) at the correspondent node. When this binding is known by the CN, the CN establishes a binding cache entry (similar to the HA having a binding cache entry for the MN). Packets from the CN can be routed directly to the CoA of the MN. When sending a packet to any IPv6 destination, the CN checks its cached bindings for an entry for the packet's destination address. If a cached binding for this destination address is found, the CN uses a new type of IPv6 routing header to route the packet to the MN by way of the CoA indicated in this binding.

The MIPv6 specification (Johnson et al., 2004) defines the Return Routability (also abbreviated as RR) procedure that authorizes the BU sent by the MN by the use of a cryptographic token exchange (keygen tokens). Such procedure is needed since the CN shall accept binding updates only from MNs that have previously proven the reachability for their home address and care-of-address. The binding update by the MN is signed by binding management key (Kbm) that is generated based on the keygen tokens obtained from CN separately for the home address and care-of-address. The RR procedure allows through the exchange of messages between MN and CN to verify each other without pre-arranged security association.

FIG. 3 depicts the signalling flow performed for RO. MN sends two messages to CN over different routes. One message—Home Test Init (HoTi) message—is sent to HA over the MIP IP-in-IP tunnel and afterwards HA forwards the message to CN. The other message—Care-of Test Init (CoTi)—is sent directly to CN. Both messages HoTi and CoTi contain cookies that are returned by the CN back to the MN. After receiving the HoTi and CoTi messages, the CN sends two messages back to the MN again over different routes. Home Test (HoT) message is sent to the MN's HoA, i.e. to the HA, and the HA forwards the message to the MN over the MIPv6 tunnel. Care-of Test (CoT) is sent directly to the MN.

Both messages HoT and CoT contain "home keygen token" and "care-of keygen token" respectively. They are based on CN's currently active secret key, nonces, and home or care-of address (respectively). After the HoT and CoT messages arrive at the MN, the MN uses the keygen tokens and generates Binding Update (BU) message and sends it to the CN. After receiving the message, the CN can update its binding cache with the binding of MN's HoA and CoA. The detailed RR and RO procedures are described in sections 5.2, 6.1, 9.4 and 9.5 in Johnson et al., 2004. RFC4866 (J. Arkko, C. Vogt, W. Haddad, "Enhanced Route Optimization for Mobile IPv6", RFC 4866, May 2007) specifies an Enhanced Route Optimization mechanism aiming to provide lower handover delays, increased security, and reduced signalling overhead. This document assumes the deployment of cryptographically generated home addresses as specified in RFC3972 that increases the security. In order to reduce the handover delay, the document specifies a mechanism where the MN after a handover may send an "early binding update" (early BU) signed solely by the HoT keygen token obtained by the CN before the handover. The early BU contains a CoTi message as well. At reception of the early BU the CN verifies the used sign and if the result is positive, it establishes a temporary BCE for the MN. The CN further sends binding update acknowledgement (BA) appending the reply to the CoTi message, i.e. including the CoT keygen token. After the MN receives the BA, it generates and sends a "complete BU" to the CN. At reception of the complete BA, the CN updates the MN's BCE. More details about the enhanced Route Optimization can be found in Arkko et al., 2007.

Route Optimization in PMIPv6

Route Optimization in PMIPv6 is not specified at this moment. However, there are two main groups of approaches describing how that could be achieved.

Please note the route-optimized path is sometimes called route-optimized tunnel because the entities performing RO include additional IP header options that help the processing of the packets in end nodes, but does not influence the routing in the Internet.

RR-Based PMIP RO Approach

The Internet Draft (B. Sarikaya, A. Qin, A. Huang, W. Wu, "PMIPv6 Route Optimization Protocol", draft-qin-netlmm-pmipro-00.txt, February 2008) describes the applicability of Enhanced Route Optimization for Mobile IPv6 specified in RFC4866 for PMIPv6. The MAG, to which the MN is attached, performs Return Routability procedure with the CN (or CN's MAG) on behalf of the MN to obtain the "home keygen token" and "care-of keygen token". The MAG's IP address is used as CoA. Optionally the MAG may uses cryptographically generated home addresses so that no more home test is needed after the initial home test. Handover home keygen token is used during handover in order to eliminate home test for the next MAG. Thus, the MN's MAG establishes a BCE in the CN (or CN's MAG). In such case, the packets from CN are sent to the MN's MAG address (that has the role of MN's CoA). If the CN is mobile, then it is advantageous if the CN (or CN's MAG) establishes a BCE in the MN's MAG as well. This could be achieved by the RR procedure. This is depicted in FIG. 4. The solid line shows the route optimized path between MAG1 and MAG2, whereas the dotted line depicts the route before the route optimization via HA/LMA1 and HA/LMA2. The callouts at MAG1 and MAG2 show the BCEs that are established those entities after the exchange of proxy binding updates.

Further, the method proposed in Sarikaya et al., 2008, suggests a context transfer between previous and new MAGs, when the MN is in process of handover, in order to let the new MAG know the home keygen token from the CN to be able to send early BU. The result is a route-optimized path between MN's MAG and CN's MAG. The whole procedure is transparent to the end nodes.

In summary, Sarikaya et al., 2008, proposes a PMIP RO approach that is based on the RR procedure. The advantage is that the MAGs may not have a trust relationship and can establish it dynamically via the RR procedure.

LMA-MAG Exchange-Based Approach (LMA-Based PMIP RO)

There is another general approach for PMIP RO that is based on the RO-related message exchange between the involved LMAs and MAGs. This general approach with different flavours is described in M. Liebsch et al., 2007 (M. Liebsch, L. Le, J. Abeille, "Route Optimization for Proxy Mobile Ipv6", draft-abeille-nettlmm-proxymip6ro-01.txt, November 2007); R. Koodli et al., 2008 (R. Koodli, K. Chowdhury, "Local Forwarding in Proxy Mobile IPv6", draft-koodli-netlmm-local-forwarding-00.txt, July 2008); and A. Dutta et al., 2008 (A. Dutta et al., "Proxy MIP Extension for Inter-MAG Route Optimization", draft-dutta-netlmm-pmipro-01.txt, July 2008). The common concept of all these documents is that one LMA (if both the communicating MNs are attached to the same LMA) or more LMAs (if the communicating MNs are attached to different LMAs) take the decision for PMIP RO and instruct the MAGs to forward the data packets directly between each other. It is assumed that the MAGs that set up the RO tunnel are a part of the same network operator or at least they trust each other, so that they can establish a security tunnel among each other to forward data packets.

One example of how this approach works can be given based on the scenario from FIG. 4. There should be the pre-assumption that LMA1 and LMA2 can somehow discover and agree that PMIP RO between MAG1 and MAG2 is needed and shall be performed. Than the LMAs exchange information about the MNs and corresponding MAGs, e.g. LMA2 may inform LMA1 that a PMIP RO between MN1 and MN2 is desired and that MN2 is attached to MAG2.

Consecutively, LMA1 generates a route update message to MAG1 to trigger MAG1 to start the forwarding over a tunnel to MAG2 for packets destined to MN2. Similarly, LMA2 sends a route update message to MAG2 to trigger MAG2 to start the forwarding a tunnel to MAG1 for packets destined to MN1.

After MAG1 and MAG2 process the route update messages they start to tunnel packets between each other for MN1-MN2 traffic.

A detailed description of such inter-LMA PMIP RO can be found in section 4.2. in Dutta et al., 2008. The approach described in this paragraph can be also called "LMA-based PMIP RO"

Both approaches—the RR-based described in B. Sarikaya et al., 2008 and the LMA-MAG exchange-based described in Liebsch et al., 2008, Koodli et al., 2008 and Dutta et al., 2008—do not consider the case where a MN located in the PMIP domain changes from network-based mobility to host-based mobility scheme or vice versa.

SUMMARY

This application focuses explicitly on this later scenario. In the priority application the concept described B. Sarikaya et al., 2008, was presumed as the method for setting up RO in PMIPv6.

The invention focuses explicitly on this later scenario. The concept described in Sarikaya et al., 2008, as the method for setting up RO in PMIPv6 has previously been assumed. However, in this application the approach described in documents above is also considered.

The scenario considered in this invention is depicted in FIG. 5. In this figure, the role of CN, as described in Johnson et al., 2004, is illustrated by MN2, since the CN may be mobile, too. As an example, it is assumed that the MN1 and MN2 are located in different PMIPv6 domains; however, the invention is also applicable if they are located in the same PMIPv6 domain. Before the movement, the PMIPv6 RO has been set up between the MN's MAG and CN's MAG. The MN and CN are unaware about the RO path. When the MN moves outside the PMIP domain, it sets up MIPv6 tunnel to its home agent. However, the CN's MAG continues to route the data packets to the MN's previous MAG, which results in data packets loss.

Further, assuming that the data packets are somehow forwarded to the home agent after the MN hands over outside the PMIP domain, the end-to-end delay may be considerably increased which in turn may result in retransmission timeout in the transport layer.

This invention relates to scenarios where a proxy Route Optimization is set up by a MAG on behalf of a MN in a PMIP domain, so that the data packets take the optimal route between MN's MAG and CN (or optionally to CN's MAG). In order that the RO works in both directions, the CN (or CN's MAG) may initiate RO as well, so that a BCE is established in the MN's MAG. If a MN moves out of the PMIP domain and performs MIPv6 registration with the HA/LMA, the CN's data packets are lost because they arrive at the MAG. Therefore means are required to update the CN's BCE on time, i.e. to delete the MN's BCE, so that the CN can start forward the data packets to the MN's HoA. However, even if this optimization is implemented, the data packets are routed on non-optimal path and as result the end-to-end delay is increased, which can impact the application performance. Especially in cases where the distance between MAG and LMA is large, the round-trip time of the route-optimized path before the handover may be considerably smaller than the round-trip time of non-optimal path after the handover. In such cases, the transition from route optimized to non-optimal path may result in transport protocol time outs, and thus, in application performance drawbacks.

The main problem targeted by this invention is to avoid increase of the handover impact on the application compared to the MIP mobility domain, e.g. to achieve similar performance as in RFC4866.

The present invention has been made in consideration of the situation described above and has as its object to avoid the packet losses and to reduce the end-to-end delay of data packets when an MN performs handover between the PMIP domain and MIPv6.

This object is solved by the independent claims. Advantageous embodiments of the invention are subject matters of the dependent claims.

To achieve this object the current invention provides a method, a mobile node, a mobile access gateway, a home agent and a communication system for handover of a mobile node between access networks either supporting network based mobility or not supporting network based mobility, in a packet switched communication network comprising at least the mobile, mobile access gateway, a correspondent node and a home agent. The method comprises the steps of performing proxy route optimization towards the correspondent node on behalf of the mobile node, performing handover from a current access network to a target access network, and determining whether the proxy route optimization is needed after the handover. If the proxy route optimization is needed after the handover, it is determined whether return routability based route optimization or home based route optimization are to be carried out, and if return routability based route optimization is to be carried out information regarding the proxy route optimization is sent to the mobile node by the home agent. If home agent based route optimization is to be carried out the method further comprises the following steps of generating and managing a route optimization state in a mobile node by the mobile node's home agent, and updating the correspondent nodes routing state with the mobile node's new location.

In a further advantageous embodiment after generating and managing the route optimization state in the mobile node, the mobile node's new location is registered in a correspondent node by the home agent if the correspondent node is attached to the same home agent, and if the correspondent node's home agent is different from the mobile node's home the correspondent's home agent is informed of the new mobile node's new location by the mobile node's home agent, and a routing state in the correspondent node is updated by the correspondent node's home agent.

A further embodiment of the invention relates to the mobile node updating the correspondent node's routing state after sending information regarding the proxy route optimization to the mobile node by the home agent.

In a further embodiment of the invention after determining whether the proxy route optimization is needed after the handover, the proxy route optimization is deregistered with the correspondent node or the correspondent node's mobile access gateway by the mobile access gateway or the home agent, if the proxy route optimization is not needed after the handover.

Another advantageous embodiment of the present invention relates to the routing state in mobile access gateways being updated by home agents.

According to a further advantageous embodiment the signalling enabling communications between the mobile node, correspondent node, home agent and mobile access gateway is carried out using route optimization signalling. In a further advantageous embodiment integrity projection or encryption is used in the route optimization signalling.

BRIEF DESCRIPTION OF THE SEVERAL VIEWS OF THE DRAWINGS

Further features and advantages will become apparent from the following, and more particular description of the various embodiments of the invention as illustrated in the accompanying drawings, wherein.

DETAILED DESCRIPTION

Figure 1:
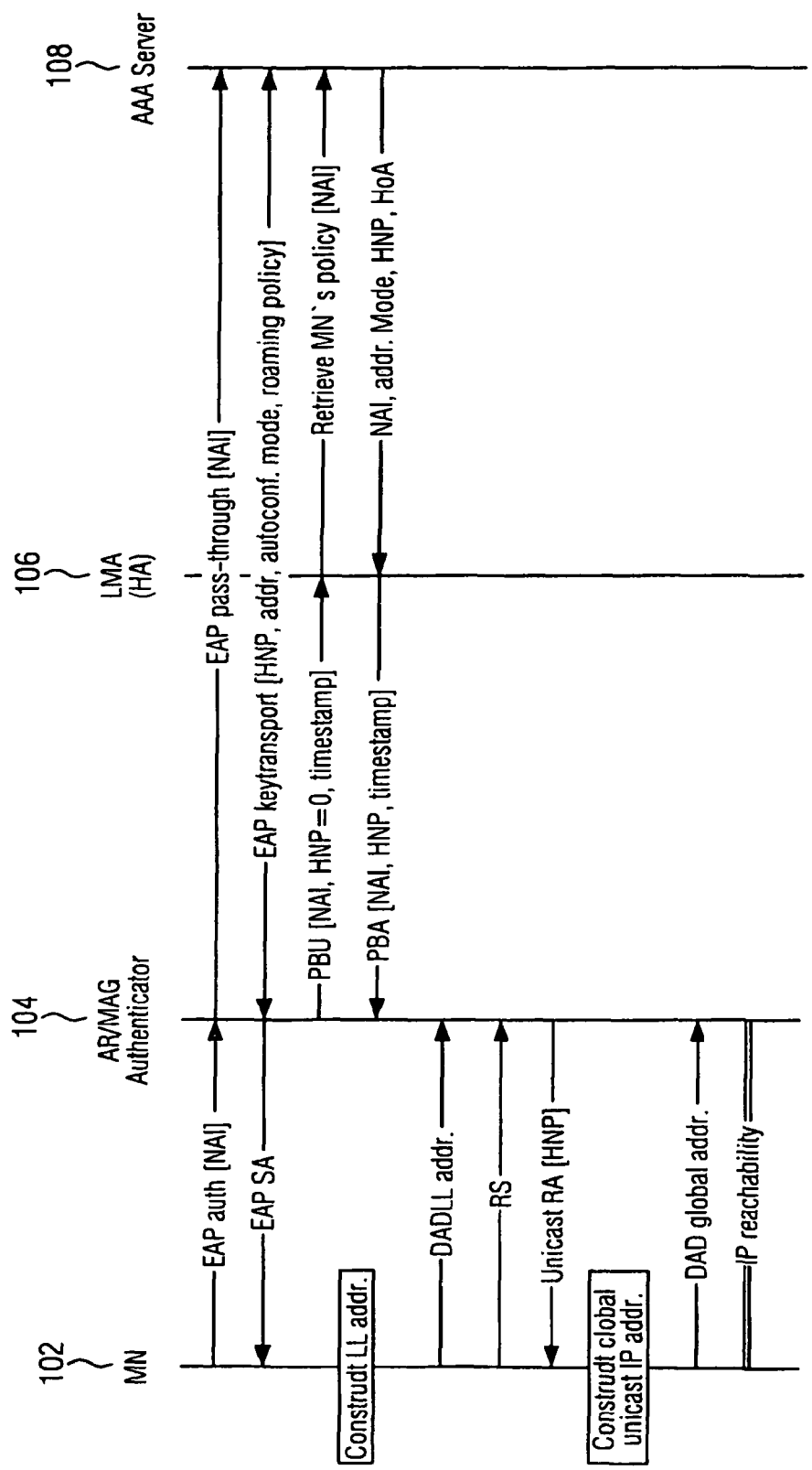
FIG. 1 shows an exemplary signalling flow for PMIPv6 during initial attachment.
Figure 2:
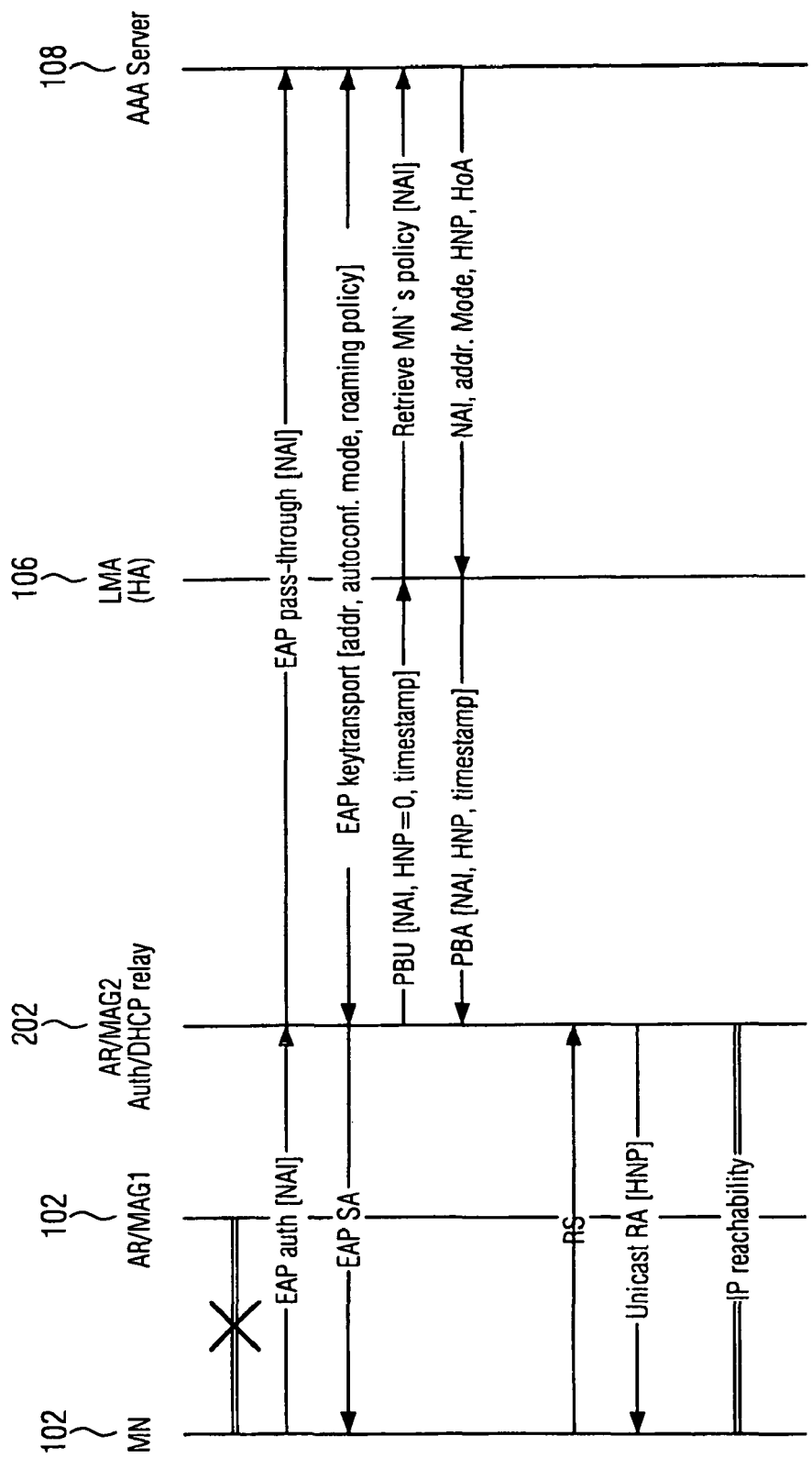
FIG. 2 depicts an exemplary signalling flow for PMIPv6 during inter-MAG handover.
Figure 3:
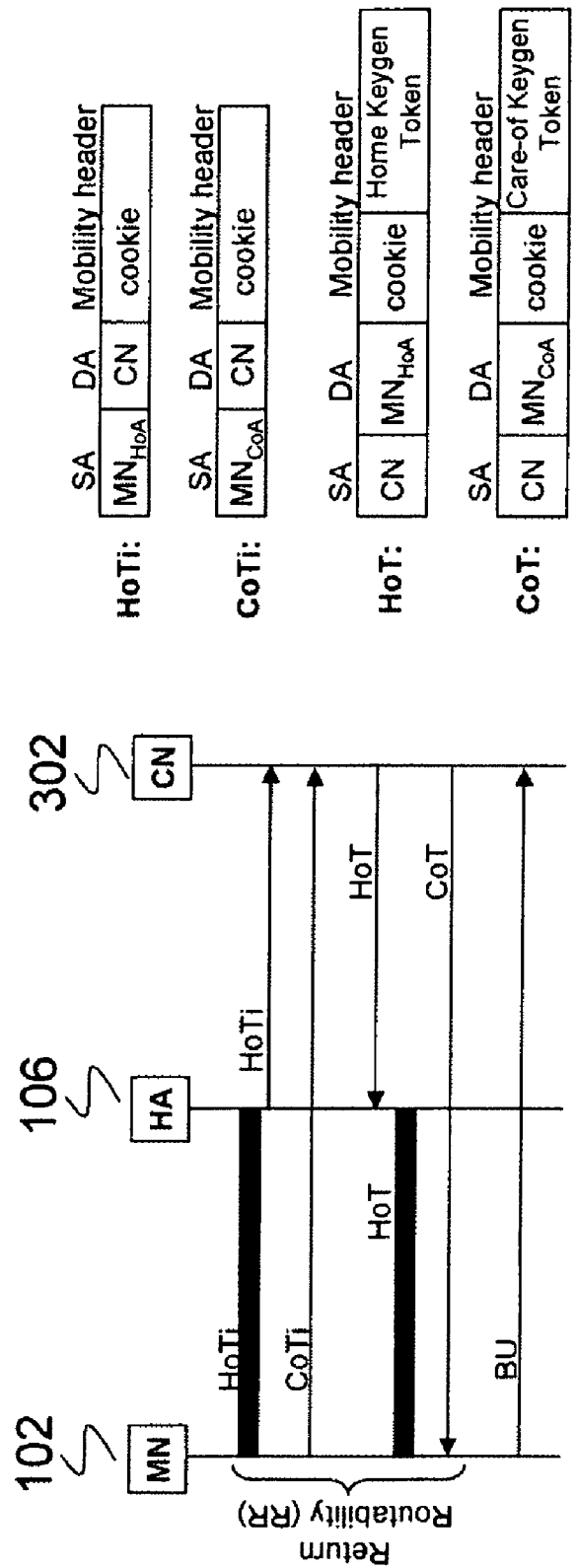
FIG. 3 shows MIPv6 Route Optimization signalling messages and their formats.
Figure 4:
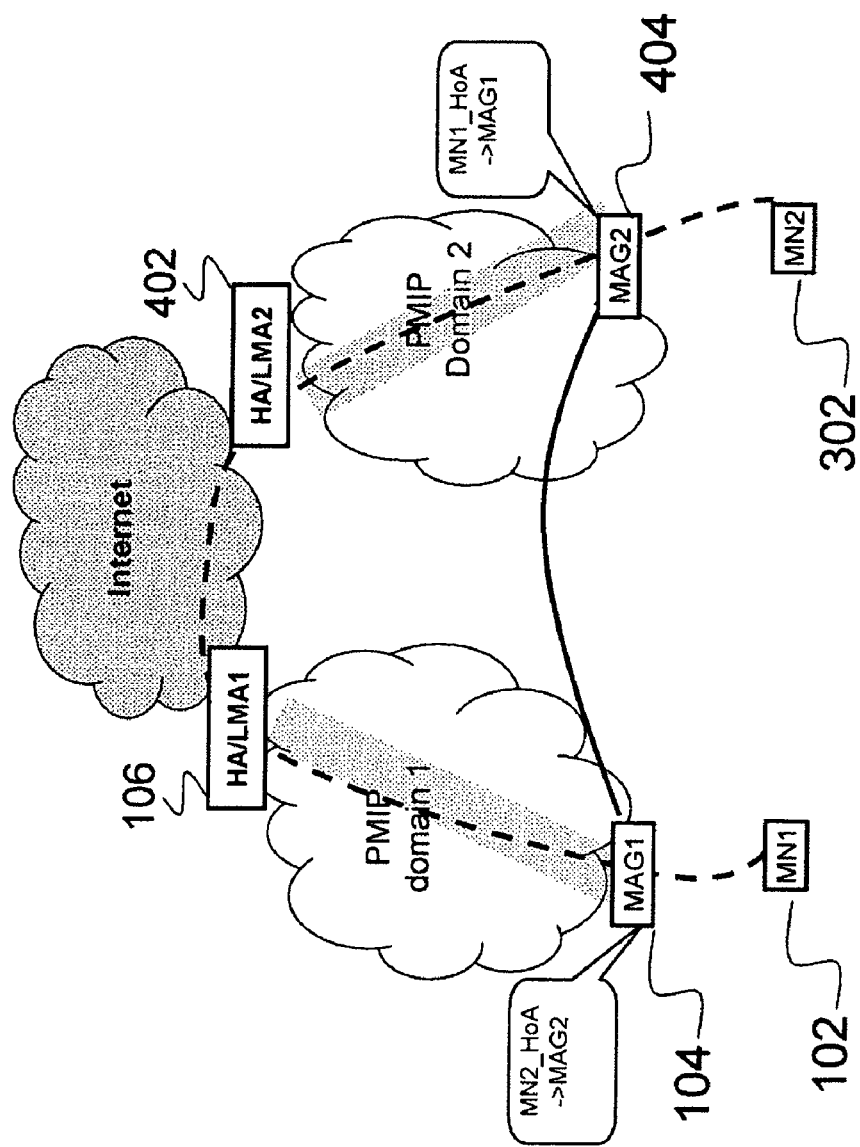
FIG. 4 shows an example for RO between proxy entities (MAG1 and MAG2) in PMIPv6.

The following paragraphs will describe various embodiments of the invention including route optimisation continuity at handover from network-based to host-based mobility, and illustrates further, alternative, configurations.

For exemplary purposes only most of the embodiments are outlined in relation to a MIPv6 communications system, and the terminology used in the subsequent sections mainly relates to MIPv6 terminology. However, the terminology used and the description of the embodiments with respect to a MIPv6 architecture is not intended to limit the principles and ideas of the inventions of such systems.

Also the detailed explanations given in the technical background section above are merely intended to better understand the mostly MIPv6 specific exemplary embodiments described in the following, and should not be understood as limiting the invention to the described specific implementations of processors and functions in the mobile communications network.

Different mobility management schemes, such as host-based (known as Mobile IPv6 protocol, MIPv6) and network-based (known as Proxy Mobile IPv6 protocol, PMIPv6), can be applied to support session continuity during the movement of a mobile node (MN) in data networks. In host-based mobility scheme, the route optimization between MN and correspondent node (CN) is set up and managed by the MN. On the other hand in network-based mobility, since the purpose is to manage the mobility-related signalling by network entities, the route optimization is set up between the MN's proxy mobility entity (e.g. Mobile Access Gateway, MAG) and the CN. Thus, different entities manage the route optimization with the CN in the different mobility schemes. Now, if a MN performs handover between the two mobility schemes and route optimization has been set up before the handover, according to the available prior art, the route optimized path needs to be terminated.

The term route optimization signalling generally refers to signalling that carries route optimization information. In different circumstances this can have a slightly different specific impact. In the case of MIPv6 route optimization according to RFC3775 and RFC4866, the route optimization signalling encompasses the RR signalling between MN and CN. In the context of this application and the RR-based route optimization as described above, the route optimization signalling encompasses the signalling between HA and MN (enhanced BA or enhanced GSM signalling) that carries route optimization information. In the case of HA-based route optimization, the route optimization signalling means enhanced BA or enhanced GSM signalling between the HA and MN as well as between the HA and CN.

This application discloses a method enabling the MN to preserve the proxy route optimization set up in the network-based mobility domain, while the MN hands over to host-based mobility domain. For achieving this, the MN is informed about the proxy route optimization set up by the MAG with the CN. This is performed during the MN's MIPv6 registration process, i.e. during the exchange of Binding Update (BU) and Binding Acknowledgement (BA) messages with the Home Agent (HA). Additionally, the HA stores the information needed by the MN to perform the route optimization from the host-based mobility domain. As the HA sends the proxy route optimization-related information to the MN, it can be described as HA-triggered route optimization. The MN does not need to perform measurements and decisions whether to start route optimization with any of the CNs.

This application describes a method enabling the MN to preserve the RO path set up in the PMIP domain while the MN hands over to host-based mobility domain. For achieving this, the HA informs the MN about each of the ongoing proxy route-optimized paths, in which the MN's MAG is participating. This is performed during the MN's MIPv6 registration process, i.e. during the exchange of Binding Update (BU) and Binding Acknowledgement (BA) messages with the HA. The proxy RO-related information is carried in an enhanced BA message carrying the CNs' addresses and optionally the HoT keygen tokens, generated by the CNs during the proxy RR procedure performed by the MN's MAG. Having this information the MN can immediately update the CN's BCE after the MIP registration. Additionally, the HA stores the proxy RO-related information needed by the MN. The invention describes a mechanism for MAG-LMA message exchange in order to keep the LMA updated with the route-optimized paths per MN. As the HA sends the RO-related information to the MN, it can be described as HA-triggered RO. The MN does not need to perform measurements and decision whether to start MIPv6 RO with any of the CNs.

Figure 8:
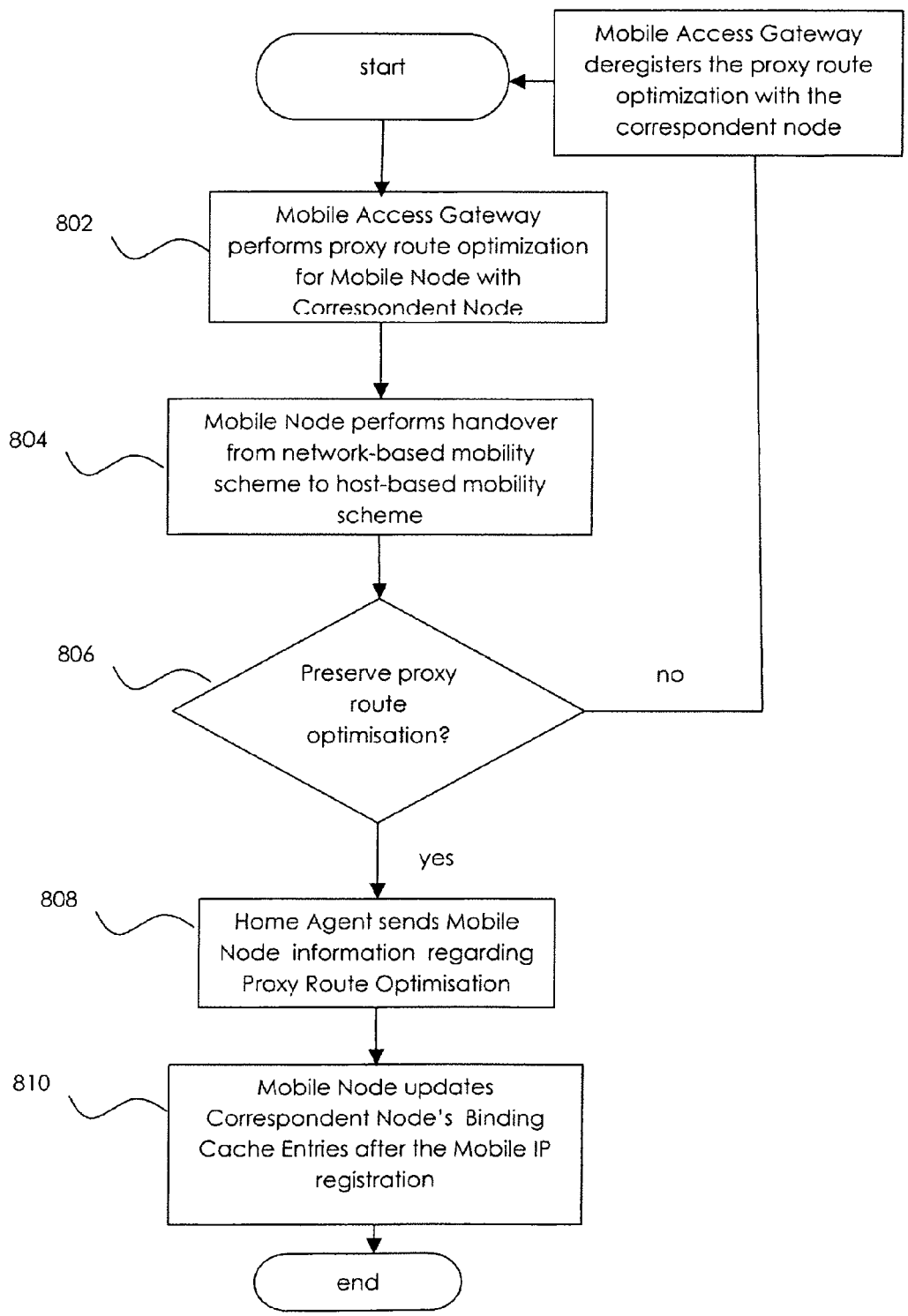
FIG. 8 is a flow diagram of an embodiment of the present invention.

FIG. 8 is a high level flowchart of the method of the invention. In step 802 the Mobile Access Gateway (MAG) performs Proxy Route Optimisation (PRO) for the Mobile Node (MN). When the MN moves from an access network supporting network-based mobility, also referred to as a network-based mobility scheme, to an access network not supporting network-based mobility, also referred to as a host-based mobility scheme, it performs a handover, as shown in step 804. After this handover a decision has to be taken in step 806 whether to preserve or maintain the proxy route optimisation. This decision will generally be taken by the MAG. In one embodiment the Home Agent (HA) takes this decision, in which case the MAG does not.

If PRO is not to be maintained, the MAG shall take actions to deregister the MN with the CN in order to delete the MN's BCE in CN. After that deregistration the CN starts forwarding packets to the MN's HoA, i.e. the packets arrive at the LMA/HA.

If PRO is to be maintained the HA sends information regarding the PRO to the MN in step 808. Then, in step 810, the MN updates the Correspondent Node's (CN) Binding Cache Entries (BCE) after the Mobile IP registration.

Figure 5:
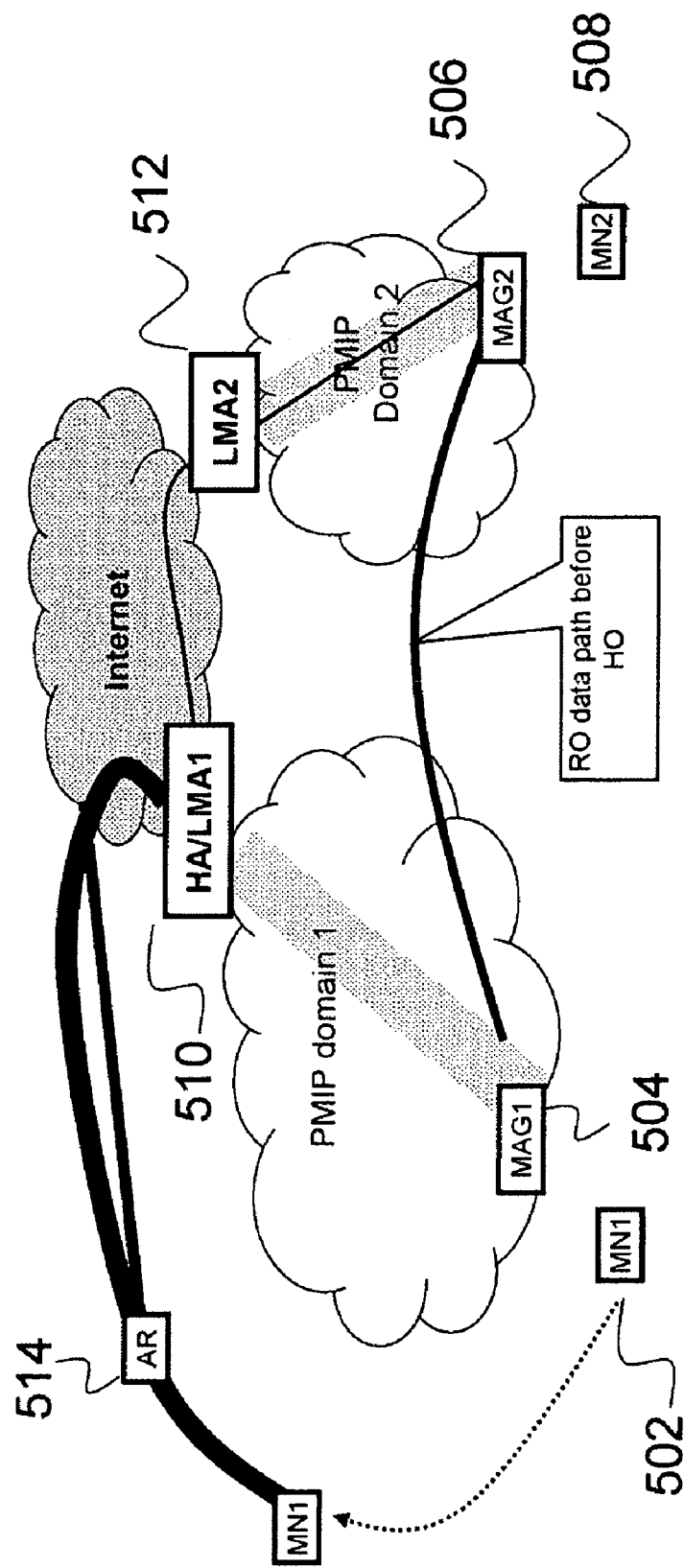
FIG. 5 depicts the scenario assumed in this invention: a MN moves outside of the PMIPv6 domain to an Access Router and uses MIPv6 for mobility.

In the following the idea is described in more detail,

As it is depicted in FIG. 5, at an initial point it is assumed that a PMIPv6 route-optimized path is set up between MAG1 504 and MAG2 506 that correspondingly serve MN1 502 and MN2 508. It is further assumed that MAG1 504 and MAG2 506 maintain Binding Cache Entries (BCEs) for each route-optimized path. MAG1 504 and MAG2 506 can update the BCEs of each other. One possible way to update the BCEs is to use a proxy RR and RO procedures described in Qin et al., 2007. Other methods are also possible. The presented solution is valid also for the case, in which the RO path is set up between MAG1 504 and MN2 508. FIG. 5 shows that MN1 502 and MN2 508 are connected to different PMIPv6 domains, however, the proposed solution is applicable to the case where both nodes are connected to the same PMIPv6 domain.

RR-Based PMIP RO

After the MN1 502 moves outside the PMIPv6 domain, it initiates the MIPv6 registration procedure with the HA 510. After performing the HA discovery and security association with the HA 510, the MN 502 is ready to send a BU.

In one embodiment of the application, it is assumed that the MN 502 sends enhanced BU including requesting information about existing proxy route-optimized paths that may have been performed by a possible proxy in the PMIP domain. According to the specification in Gundavelli et al., 2007, the MN 502 does not know about the presence of PMIP entities, therefore it can only suggest that there could be a proxy entity (e.g. MAG) that assists its mobility. Such requesting information could be either a flag called e.g. "proxy RO" (P-RO), or the IP addresses of the CNs (e.g. the CNs home addresses), with which the MN is currently communicating.

The MN 502 may express the requesting information in other ways. The MN 502 may also send a regular BU as specified in Johnson et al., 2004.

The MN 502 may implement decision mechanism whether to send an enhanced BU or a regular BU to the HA 510. According to the current state-of-the-art, the MN 502 does not know about the existence of PMIPv6 functionality on the network side. With other words, the MN 502 is not aware of the presence of MAG and LMA entities in the network. The decision mechanism is as follows:

If the MN 502 has some means to know about the presence of PMIPv6 functionality and the MN 502 performs a handover from PMIPv6 to MIPv6 network, the MN 502 may send an enhanced BU to the HA 510.

If the MN 502 does not know about PMIP domain functionalities, the MN 502 may for example always send an enhanced BU when performing a handover from the home to foreign link.

Otherwise the MN 502 sends a regular BU to the HA 510.

When the HA 510 receives a BU from the MN 502, it first checks if the BU is enhanced (including RO requesting information) or a regular BU.

If the BU is enhanced, the HA 510 must provide the proxy RO-related information (if available) in an enhanced BA. The HA 510 can posses proxy RO-related information only if it implements the LMA functionality and if the MN 502 was attached to this LMA 510 before the handover.

If the BU is a regular BU, HA/LMA 510 is responsible to assure that if proxy RO-related information is available for the MN 502, it is signalled in the enhanced BA. The HA 502 may check in the LMA database whether the MN 502 was previously registered with the LMA and whether there were proxy route optimized paths for that MN 502. If this is the case, the HA/LMA 510 includes the proxy RO-related information in the enhanced BA and sends it back to the MN 502.

If the MN 502 is not present in the LMA's database, or there is no proxy RO-related information stored in the PMIPv6 domain for this MN 502, the HA/LMA 510 replies either with regular BA (no presence of proxy RO-related information) or with an enhanced BA including information that no proxy RO information is present. The later could be for example a flag proxy-RO "P-RO" set to negative state.

If the HA/LMA 510 has proxy RO-related information for the MN 502, it replies with an enhanced BU including "P-RO" flag set to positive state and proxy RO-related information. The proxy RO-related information includes the IP addresses of the CNs, to which RO sessions exist. If the HA 510 knows that a given CN 508 is attached to a MAG 506, the HA 510 includes the MAG's IP address as a CoAs for the CN. Further the enhanced BA includes the HoT keygen tokens for each RO session with a particular CN.

It is to be noted that this invention modifies the behaviour of the LMA as specified in Gundavelli et al., 2007, as the LMA shall not immediately delete the BCE for a MN, after a MAG deregisters this MN. The LMA puts the BCE entry in inactive state (i.e. not used for forwarding data packets to MAG) for a pre-configured time period. After this time elapses the LMA deletes the BCE. This behaviour is needed in case that the PMIPv6 deregistration from MAG arrives earlier at the HA/LMA then the MIPv6 registration from MN.

At reception of regular BA with no proxy RO-related information, the MN 502 behaves as a regular MIPv6 mobile node as described in Johnson, 2004. However, if the MN 502 receives enhanced BA containing proxy RO-related information, the MN 502 initiates RO with the CNs listed in the enhanced BA. In case that the enhanced BA contains a CoA for a given CN (i.e. MAG1 has set up the RO to the CN's CoA, which can be either the CN's MAG, or the CN is in a foreign network and has configured a CoA), the MN 502 must create temporary BCE for that CN.

To decrease the RO registration delay, a preferred embodiment in this invention is that the MN 502 sends an early BU to each CN reported in the enhanced BU form HA 510. Thus, the MN 502 would update the CN's BCE with its new CoA. The early BU contains a binding management key (Kbm). The Kbm in the early BU to each CN is generated based on the respective HoT keygen token contained in the enhanced BA. The MN 502 sends the early BU to the CN address reported in the enhanced BA. If the MN 502 creates BCE because the reported CN address in the enhanced BA was CoA, the MN 502 sends the early BU to the CN's CoA.

In another embodiment of the invention, the MN 502, after receiving the enhanced BA, starts RR procedure with the CN 508 and consecutive sending of BU for creating/updating a BCE in the CN 508. This embodiment has the disadvantage of larger delay for updating the CN's BCE, since the RR procedure must be first completed before the MN 502 sends BU to CN.

In contrast, in the preferred embodiment described above, the MN 502 sends early BU immediately after the reception of enhanced BA. Please note, that the early BU establishes only a temporary BCE in the CN 508. The RR procedure should be performed later and complete BU must be sent to the CN 508.

It should be noted that this application modifies the behaviour of the MN 502 with respect of creating a BCE for routing packets to other nodes (in the description above this means to other CNs). Johnson et al., 2004, specifies that the MN creates a BCE for a correspondent node after reception of a valid BU by that correspondent node. In this invention the MN 502 is allowed to create a BCE based on the information contained in the enhanced BA coming from the HA 510. If the enhanced BA contains a CoA for a given CN 508, the MN 502 should create a temporary BCE for that CN 508.

In this section two examples with the exact signalling flow for the mechanism described above are given. These two examples are depicted with the help of FIG. 6 and FIG. 7. The texts highlighted with bold italic font in both figures denote new messages or new options in the existing message formats.

Figure 6:
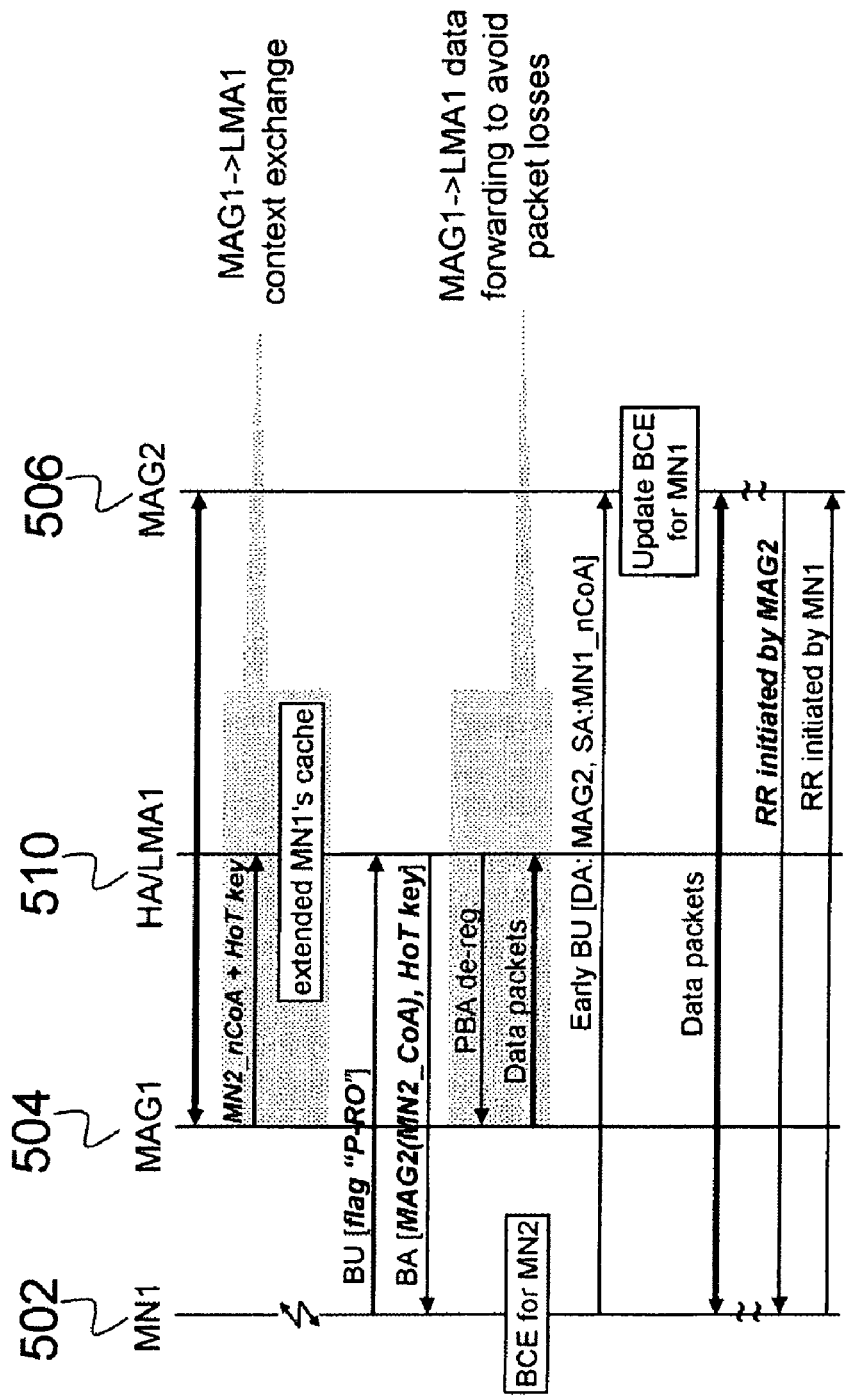
FIG. 6 shows the signalling flow in case that context transfer between MAG1 and LMA1 is performed pro-actively (before the handover)

The signalling flow of the above description is depicted in FIG. 6. Please note that the same assumptions as in FIG. 5 are made, i.e. MN 502 and CN are represented as MN1 502 and MN2 correspondingly and the RO is set up between MAG1 504 and MAG2 506. In this invention we describe two options regarding how HA/LMA 510 is informed by MAG1 504 about the MAG1-MAG2 route-optimized path. The upper part of FIG. 6 shows option 1 of the information exchange between MAG1 504 and LMA1 510, called pro-active context exchange. Here, MAG1 504 informs LMA1 510 about the MAG1-MAG2 route-optimized path for MN1 502 immediately after the RO path setup is completed. MAG1 504 sends complete information about the MN's RO sessions (below this information is called "proxy RO-related information") and LMA1 510 stores this information in extended binding cache for MN1. In FIG. 6 this exchange is shown as a box called "MAG1-LMA1 context exchange". One example of proxy RO-related information sent by the MAG1 504 and stored in LMA1 510 is as follows:

At minimum the CN's address is contained. If the RO path is set up to the CN directly, the LMA 510 stores just the CN's IP address. If the RO path is set up to the CN's CoA, because CN uses MIPv6, LMA1 510 stores a binding between the CN's HoA and CoA (e.g. the data structure may look like: MN2_HoA→MAG2+"Proxy" flag). If the RO path is set up to the CN's MAG 508 acting as proxy, LMA1 510 stores the MAG2's IP address as CoA for MN2 and information that MAG2 506 is a proxy (e.g. the data structure may looks like: MN2_HoA→MAG2+"Proxy" flag). The "Proxy" flag means that the MAG 506 is acting as proxy for MN2.

For each MN RO path, MAG1 504 may send the HoT keygen token generated by MAG2 506. The LMA1 510 should store the HoT keygen token per RO path for each MN.

The proxy RO-related information is conveyed to the MN 502 in the enhanced BA message. The proxy RO-related context exchange in option 1 is performed always after RO path is set up from a proxy entity (in our example this is the MAG1 504), independent of whether it is predictable if the MN 502 will perform handover.

After sending of enhanced BA from LMA1 510 to MN 502, FIG. 6 further shows the LMA1 510 sending a de-registration message to MAG1 504. The de-registration message could be a proxy BA (PBA). The PBA may include information (e.g. a flag) requesting the MAG1 504 to forward incoming data packets to the LMA 510. This is needed in order to avoid packet losses that may occur during the time the MN1 502 updates the MN2's (or MAG2's) BCE.

After the MN1 502 receives the enhanced BA, MN 502 learns about the existing proxy RO paths with its CNs. If the enhanced BA contains CoA for a given CN, e.g. MN2 in FIG. 6, the MN 502 must create a temporary BCE for this CN binding the CN's HoA and CoA.

As described above, it is beneficial if the MN 502 sends an early BU to MN2 in order to quickly update the CN's BCE. Since the enhanced BA contains the MAG2's address as CoA for MN2, MN1 502 sends the early BU directly to MAG2 506. At the reception of early BU, MAG2 506 updates the BCE for MN1 and starts sending data packets directly to MN's CoA at AR. Later MN1 502 performs RR procedure with the MAG2 506 to obtain new HoT and CoT keygen tokens and to send a complete BU to MAG2 506.

After MN1 502 updates the BCE in MAG2 506, MAG2 506 may implement logic for detection that it also needs to perform RR and RO procedures in order to update the temporary BCE in the MN 502. Normally, MAG2 506 starts the RR and RO procedure before the lifetime of the HoT and CoT keygen tokens from MAG1 504 expires. However, since MAG1 504 is not longer involved in the RO process, MAG2 506 needs to obtain the keygen tokens from MN1 502. Therefore, MAG2 506 may implement a function for detection whether MN1 502 performs a transition from proxy-RO to MIPv6-RO.

Assuming that MAG2 506 has a "proxy-RO" flag in the BCE created by a proxy mobility agent (like MAG1), MAG2 506 can determine the transition from proxy-RO to MIPv6-RO based on the reception of a new client BU without a "proxy-RO" flag. The RR and RO procedures initiated by MAG2 506 is shown in bold italic font at the bottom of FIG. 6.

Figure 7:
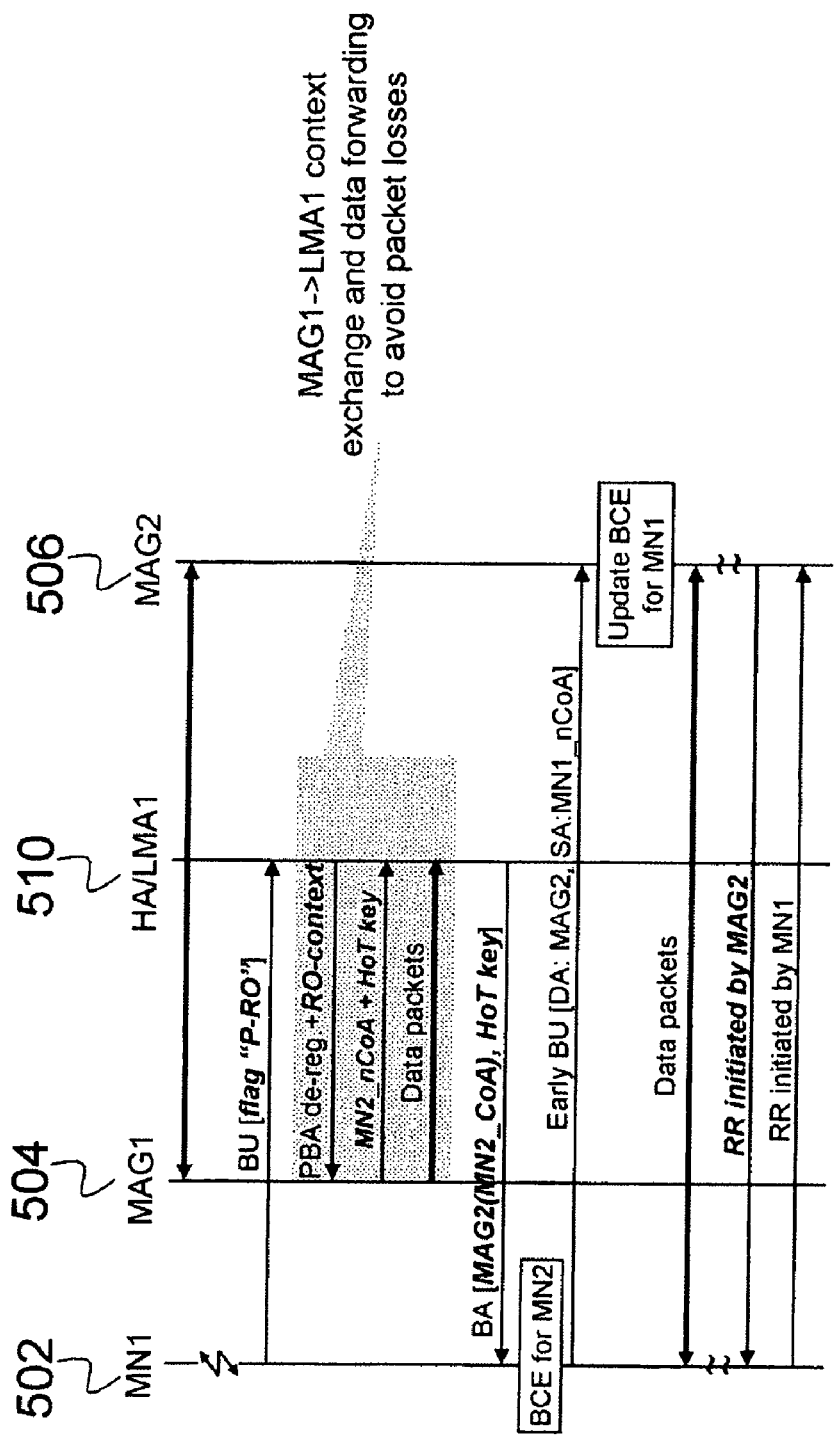
FIG. 7 shows signalling flow in case that context transfer between MAG1 and LMA1 is performed re-actively (after the handover)

This application defines a second option for the context exchange between MAG1 504 and LMA 510 that is depicted in the signalling flow in FIG. 7. In this invention the second option is called re-active context exchange between MAG1 504 and LMA1 510 because the exchange takes place after the MN 502 moves outside the PMIPv6 domain and sends BU to the HA/LMA 510.

In this scenario, LMA1 510 does not maintain proxy RO-related context before the handover. After MN1 502 sends enhanced BU with flag "P-RO" or even a regular BU, LMA1 510 first sends de-registration message to MAG1 504 and additionally asks for proxy RO-related context. The de-registration message could be a proxy BA (PBA) and it could be extended to include requesting information for route optimization (similar to the extended BU from MN to HA). After MAG1 504 receives the de-registration message and the requesting proxy RO-related information, the MAG1 504 informs LMA1 510 about the RO paths for the given MN 502 (in our example this is MN1 502 and RO path is between MAG1 504 and MAG2 506). The information sent to the LMA 510 includes the same proxy RO-related information as described in option 1 (i.e. CN's address that may be a CoA and HoT keygen token). MAG1 504 also starts forwarding incoming data packets for MN1 502 to the LMA1 510. After the HA/LMA 510 receives the RO-related information, it sends enhanced BA to MN1 502 as described above. The rest of FIG. 7 is analogous to FIG. 6.

The advantage of option 2 compared to option 1 is that the HA/LMA1 does not need to implement extended BCE database and store the proxy RO-related information. Further, in case that MN1 does not leave MAG1 for the duration of proxy RO path, no context transfer and any proxy RO-related signalling is needed between MAG1 and HA/LMA1. However, the disadvantage of option 2 is the increased delay (in comparison to option 1) for sending the enhanced BA to MN1, and thus to the increased MIPv6 registration delay.

Detailed Description for HA-Based Client RO

There are several solution features described above that are no longer valid in the case that the PMIP RO is based on routing update message exchange between the LMAs and the MAGs, i.e. so-called LMA-based PMIP RO. These features are:

PMIP RO between the MAGs is not based on the MIPv6 RR. Therefore no HoT/CoT keygen tokens are used for the RO between MAG1-MAG2. Instead the routing states in MAG1 and MAG2 are updated by LMA1 and LMA2.

Since the LMA triggers the PMIP RO, LMA knows about MAG1-MAG2 RO and there is no need for the MAG to inform the LMA about PMIP RO as it shown in the first step in FIG. 6.

Since the HoT keygen tokens are not used for PMIP RO, the HA does not have such an information and the HA cannot send it to MN1 in the enhanced BA. Further, the MN1 is not able to send early BU to MAG2.

The BCE in MAG2 is not created based on MIPv6 RR (but based on route update messages received from LMA2), therefore MAG2 does not have shared keys with MN1. MAG2 would not accept an update message (like early BU) from MN1.

This clause describes in detail a modified solution that covers the scenario of LMA-MAG exchange-based scenario for PMIP RO. In order to cover this scenario, an entirely HA-based solution to manage (i.e. to create, maintain and delete) a BCE for RO in the MN is described.

Since the MN and the HA have a security association and trust each other, the HA can send a message to the MH for managing a BCE for RO, as such a message would not impact the security model of MIPv6. Especially HA-based RO is applicable in networks which has a tight management control over the MNs, e.g. such as 3GPP or 3GPP2 networks.

The solution in the previous sections described that the information to create a BCE for RO in the MN can be carried from the HA using an enhanced BA message. However, if the HA does not want to perform the HA-based RO immediately at registration of the MN's CoA, or the HA wants to send the RO-related information to the MN periodically or occasionally (e.g. for deleting the BCE), e.g. in order to up update the BCE in the MN for RO with other CNs, this is not possible with the enhanced BA because BA is only sent as a reply to a BU. Therefore herewith it is proposed to extend the way of carrying the RO-related BCE information, as it is proposed to use a more general signalling between MN and HA. One possible example is to use a Generic Signalling Message (GSM) that is defined specifically in Haley et al., 2008, as such messages are used to send and receive signalling events between the MIPv6 entities. For the purpose of signalling or RO-related information the messages should include IPsec information, which means at least the messages shall be integrity protected, so that the receiver (e.g. the MN) can trust the sender (e.g. HA). A more reliable way to communicate the RO-related information between HA and MN is to encrypt this information.

Figure 9:
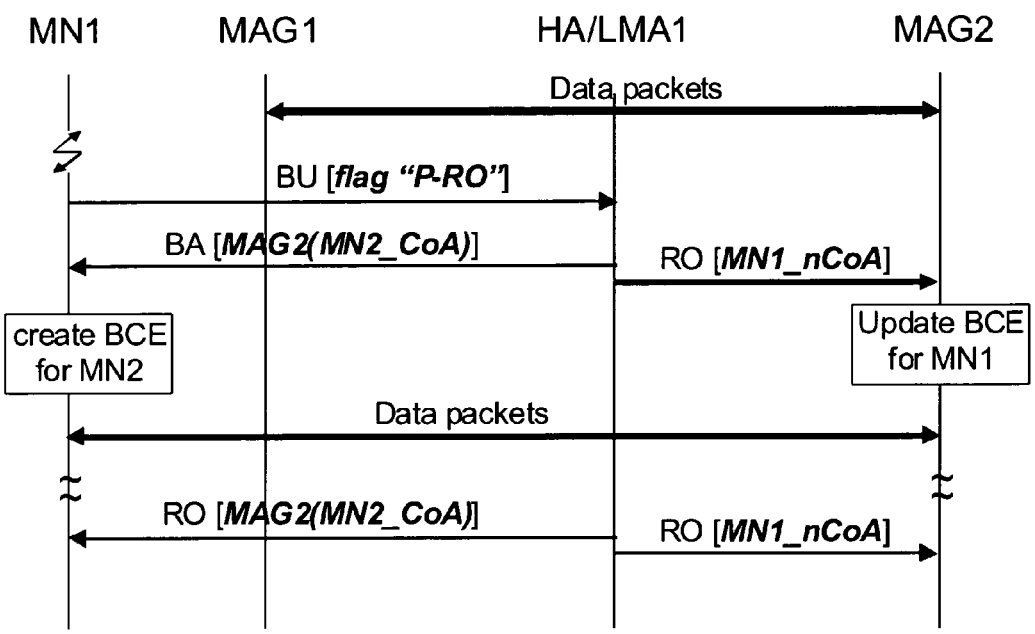
FIG. 9 shows the signalling flow of an embodiment in the case that the HA manages the RO state in the MN and MAG.

FIG. 9 shows a signalling flow for the case of HA-based RO. In the beginning there is a PMIP RO between MAG1 and MAG2. When the MN1 moves to a foreign link and sends a BU to the HA/LMA1, the HA/LMA1 replies with an enhanced BA containing the care-of address of the CN that has been used before the handover for optimized routing, i.e. the MAG2's IP address. MN creates a BCE entry for the CN's care-of address and starts sending packets to according to the BCE as described in Johnson et al., 2004.

That means the IP header contains a Home Address option where the MN's HoA is inserted, and the source address of the IP header is the MN's CoA. The HA/LMA1 also sends an RO update message to MAG2 containing the MN's new CoA in order to update the MAG2's BCE. MAG2 starts forwarding packets directly to the MN, but instead of using IP-in-IP tunnelling like in the MAG-to-MAG forwarding (e.g. in case of PMIP RO), the MAG2 uses the data packet format for the RO as described in Johnson et al., 2004.

In the above the MN's new Care of Address (CoA) can also be described as a new IP address or just as a new location.

That means the destination address is set to the MN's CoA and the IP header contains a Destination option including the MN's HoA. After processing the RO update message, the MAG2 updates its BCE. Consequently all the data packets flow directly between MN and MAG2. HA/LMA1 may periodically update the BCE states in both MN and MAG2 by sending RO update messages as shown in the bottom of FIG. 9.

The HA can initiate the HA-based RO with any node (mobile or stationary, i.e. the node can be a MN or a MAG) with which the HA has a trust relationship, e.g. IPsec-based security association. It is important that the node implements the needed function to process the messages containing RO-related information and to establish a BCE for RO. Further, the node, which obtains the RO-related information sent by the HA, must not necessarily be attached to foreign link, i.e. the node must not necessarily run MIP and have a CoA registered at the HA. The only requirement is that there is a trust relationship (e.g. IPsec-based security association) between the HA and the node.

In the following, the process is described in slightly different terms again with the help of FIG. 10.

In an embodiment of the invention Return Routability Based or LMA/MAG exchanged based PMIP route optimization is performed for a mobile node with a correspondent mode, as is depicted in step 902. Route optimization is not a necessary first step in the process but has been inserted here for exemplary purposes. Then in step 904 the mobile node performs handover and in step 906 it is decided whether proxy route optimization is needed. If it is not needed the mobile access gateway or the LMA deregisters the proxy route optimization with the correspondent node or its mobile access gateway in step 912.

If proxy route optimization is needed, it has to be determined which type of route optimization is going to be employed in step 914. If return routability based route optimization is employed the home agent sends information regarding the proxy route optimization to the mobile node is step 908. This information can for example consist of the correspondent node's address. In step 910 the mobile node updates the correspondent nodes binding cache entries after mobile IP registration. With this the process is ended.

Figure 10:
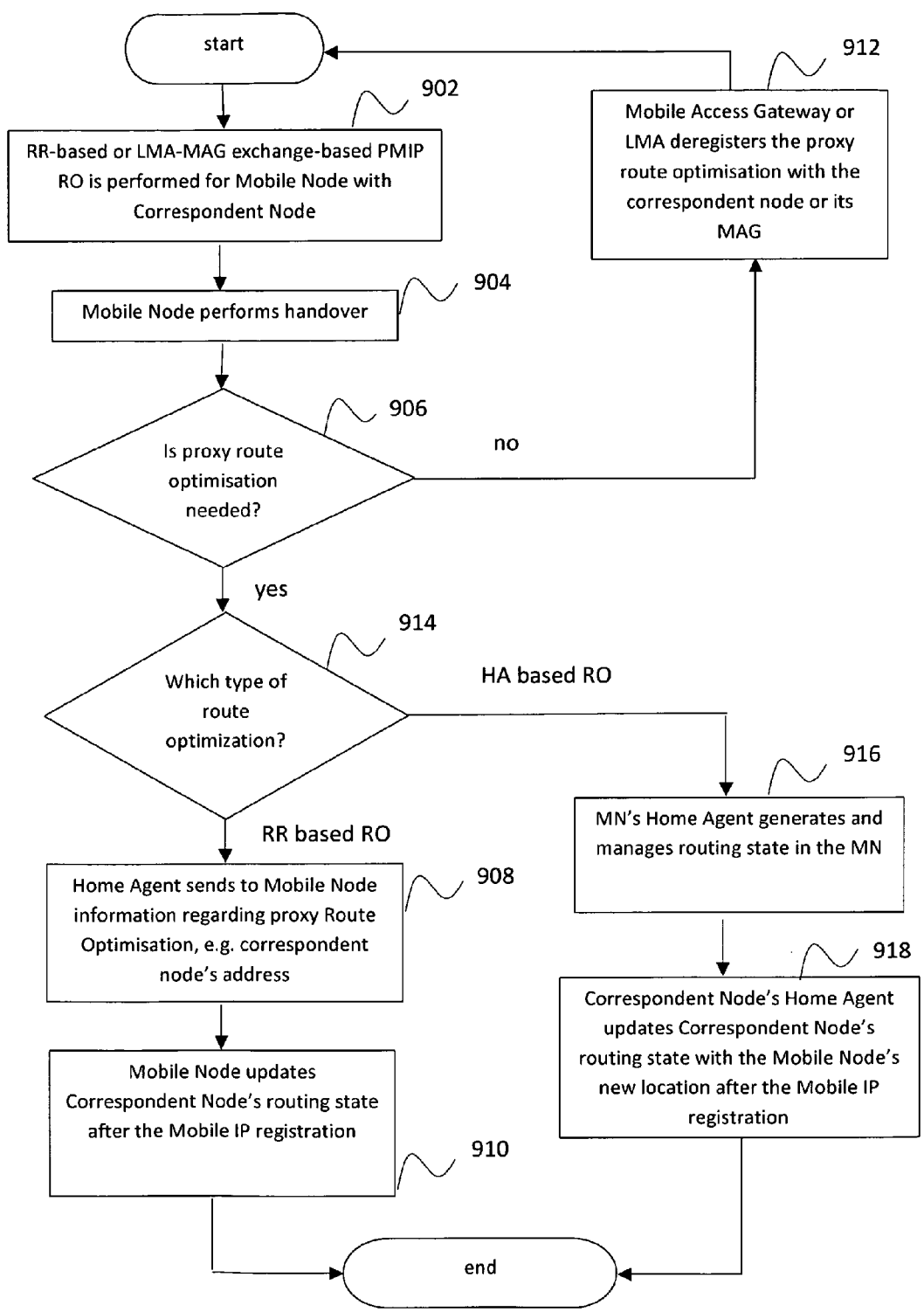
FIG. 10 is a flow diagram of an embodiment of the present invention.

If home agent based route optimization is determined the mobile node's home agent generates and manages the route optimization state in the mobile node in step 916 of FIG. 10. In step 918 the correspondent node's home agent updates the corresponding node's routing state with the mobile node's new location after the mobile IP registration. Then this process is ended.

The solution method described above is applied to a moving MN1. Analogously, the solution can be applied to a moving MN2, where a proxy RO path is available between MAG1 and MAG2. No modifications are needed in the above-described solutions.

In a different scenario, a situation can arise where MAG1 is acting as a proxy correspondent node on behalf of MN1 and the RO is initiated by MN2. In other words, the RO path is set up by MN2/MAG2, so that MAG1 has a BCE for MN2, but no RO is performed by MAG1. In such situation, if MN1 performs a transition from PMIPv6 to MIPv6, and sends BU to HA/LMA1, HA/LMA1 would reply with an enhanced BA including the CN's HoA and CoA, but no HoT keygen token. In this situation according to the description above, MN1 would start RR and RO procedures with MN2/MAG2. However, this is wrong because MN1 must only establish a BCE for MN2/MAG2, but not performing RR and RO procedures.

To avoid such erroneous behaviour the enhanced BA may contain information telling the RO direction, to/from which the proxy RO path must be, set up. For example there could be a field containing two bits specifying "TO/FROM" direction with respect to the CN (MN2). "TO" means that MN1 must perform RR and RO procedure to update the CN's BCE. "FROM" means that MN1 must create a BCE for the CN, which in turn means that in such case the enhanced BA must contain a CN's CoA. Various possibilities for the setting of the "TO/FROM" field are possible:

"TO"=1, "FROM"=0
"TO"=0, "FROM"=1
"TO"=1, "FROM"=1

The solution of "HA-based RO" proposed above earlier can be applied to a scenario of pure host-based mobility (MIPv6), i.e. without using PMIPv6. In such a scenario the HA must know the CNs, to which the MN is communicating, and can establish an RO BCE state in the MN. In other words, the HA initiates, controls and manages the RO session in the MN, for which the HA is an anchor. The main advantage is that the MN does not need to perform periodically RR to CN (the RR procedure is performed usually every 6 minutes).

As described above, the HA and the MN can use IPsec integrity protected the Generic Signalling Messages (GSM) to exchange RO-related information also in the pure MIPv6 case for applying the "HA-based RO" solution. An even more secure way to exchange such information is to use IPsec encryption in the GSM messages carrying RO information, i.e. IPsec is applied in tunnel mode, and as a consequence the intermediate nodes cannot read the RO-related information included in the GSM message.

Since two different RO approaches are available—one based on RR and another introduced herewith based on HA-controlled RO—decision criteria are needed to choose which approach should be used. Different criteria could be applied for the decision.

For example, HA-based RO is more appropriate for 3GPP networks where the network operator strives after more control on the data traffic route. Thus, the network (i.e. HA) can control whether the UE shall or shall not perform RO to a particular CN. There may be also different types of MNs attached to the same HA. For some MNs the HA-based RO is applied, whereas other MNs can use MIPv6 RR procedure to establish an RO. Some MNs may implement only RR-based approach and other only the HA-based approach.

Some realistic scenarios are described as follows:

Based on the MN's CoA the HA could determine the MN's location and can decide whether a RO to the CN is advantageous. The CN must have a security association with the HA. If the network policies allow RO and it is advantageous, the HA may send a message with RO-related information to set up a RO BCE in the CN. Every time MN changes its CoA the HA updates the RO BCE in the CN.

If 2 MNs are connected to the same HA and the HA determines based on the MNs location that RO is beneficial, the HA can initiate and control the RO BCE states in both MNs. Since the HA is the first that learns the new location of its MNs (because the MNs always send BU to the HA after changing their CoA), the HA can send an update message with RO-related information to the corresponding MN to inform it about the CoA change of the other MN.

The application of HA-based RO is more difficult in scenarios where both the communicating parties (MNs) are not attached to the same HA. It is assumed that MN1 is attached to HA1 and MN2 is attached to HA2. If there is a secure connection between HA1 and HA2, e.g. the same operator owns HA1 and HA2, the HAs must exchange information about the current location of the corresponding MNs. For example HA1 should inform HA2 about the MN1's CoA change and vice-versa HA2 should inform HA1 about MN2's CoA change.

A different issue is when a HA-based RO is triggered, especially in the case when the HA does not know the MN's CNs. A possible solution is that the HA starts the HA-based RO when the MN initiates the RR procedure with the CN.

For example, the MN decides to start RO with a CN and sends HoTi and CoTi messages. The HoTi message traverses through the HA, so that the HA can intercept this message and can determine the CN. The HA does not forward the HoTi message to the CN and additionally the HA might reply to the MN with a message having the sense of "HoTi fail" (the reason is that the MN does not continue to re-transmit HoTi message). Such a "HoTi fail" message may be a new message that does not exist currently. Afterwards the HA initiates a HA-based Ro with the CN, as the HA sends a message with RO-related information to establish an RO BCE state in the CN for the given MN. Again, the HA must have a security association with the CN in order to exchange the RO-related information in a reliable way.

Another alternative procedure could be possible in a scenario where a MN1 performs a HO to a foreign link and the HA decides to perform HA-based RO on behalf of other MNs that are anchored/connected to the HA and communicate with MN1. In such a scenario the HA sends an enhanced BA as replay to the MN1's BU, as the enhanced BA includes HA-controlled RO information. In this way an RO is achieved in direction from MN1 to the other MNs. If RO is desired in the direction from the other MNs to the MN1, then the HA should perform a HA-based RO on behalf of the MN1 to the other MNs.

A short summary of the modifications to the involved entities according to the description above is given in the following. This summary may not be exhaustive, however it summarizes some of the main points.

Modifications to the MN

Be able to generate an enhanced BU containing requesting information about existing proxy route optimization paths. Further, the MN may implement a decision mechanism whether to send an enhanced BU or regular BU to the HA.

To be able to receive enhanced BA or enhanced GSM signalling and to process that them correspondingly. That means:

To create a BCE for a given CN, for which a CoA is reported in the enhanced BA and the "FROM" flag in the "TO/FROM" field is set positive. Such BCE entry is set temporarily, as the CN/MAG2 shall at some time start RR and RO procedures.

If the HoT keygen token is included and/or the "TO" flag in the "TO/FROM" field is set to positive, MN starts enhanced RR and RO procedure as described in, as the HoT keygen token from the enhanced BA is used for generating Kbm in the early binding update.

In case that the RO signalling from the HA (e.g. enhanced GSM signalling or enhanced BA) is received periodically to update the BCE state or to delete it.

Modifications to the MAG

When a MAG detects that a MN detached from the link, the MAG puts the MN's entry in its database (e.g. BCE) in inactive state, but doesn't delete the information for a given period of time.

Implement means to accept and process request for proxy RO-related information from LMA and send such information back, if it is available for the given MN (in case of option 2). Such proxy RO-related information includes at minimum CN's IP address (HoA) and, if available, CN's CoA and HoT keygen token.

After MAG receives a de-registration message from LMA for a MN and the de-registration message requests forwarding of data packets, to forward MN's data packets (coming via RO path) to the LMA.

Initiate a proxy RR and RO procedures with a CN, in case the MAG is acting as proxy MN and if the MAG detects that the CN performs a transition from proxy-RO to MIPv6-RO. This is described above.

Modifications to the HA/LMA

To be able to receive enhanced BU, send enhanced BA to MN.

To implement means for context exchange with MAG regarding RO-related information. This invention assumes that PMIPv6 protocol is extended to carry this information. Therefore, in option 2 LMA should be capable of sending enhanced PBA requesting the RO information from MAG1.

To store CNs' HoT keygen token and CN's CoA received by MAG, (in option 1)

To request the MAG1 to forward incoming data packets for MN, in case that RO existed for the given MN.

If a MAG sends a de-registration message for a MN, HA/LMA de-activates the MN's BCE, but doesn't delete it for a given period of time. This is needed for the case that the de-registration message from MAG arrives at the HA/LMA before the BU. Having this, the HA/LMA is able to reply to the MN including the proxy RO-related information in the enhanced BA.

To implement means for HA-based RO, i.e. to support the signalling for establishing the MN's BCE for a given CN (e.g. via enhanced GSM messages) and to update periodically those BCEs and/or to delete them. Further, to be able to update the CN's BCE, if the CN is attached to the HA/LMA or correspondingly to notify the CN's HA about the new MN's CoA.

Another embodiment of the invention relates to the implementation of the various embodiments described above using hardware and software. It is recognised that the various methods mentioned above may be implemented using computing devices (processors), as for example general purpose processors, Digital Signal Processors (DSP), Application Specific Integrated Circuits (ASIC), Field Programmable Gate Arrays (FPGA) or other programmable logic devices, etc. The various embodiments of the invention may also be performed or embodied by a combination of these devices.

Further, the various embodiments of the invention may also be implemented by means of software modules which are executed by a processor or directly in hardware. Also, a combination of software modules and hardware implementation may be possible. The software modules may be stored in any kind of computer-readable storage medium, for example RAM, EPROM, EEPROM, flash memory, registers, hard disks, CD-ROM, DVD, etc.

The invention claimed is:

1. A method for handover of a mobile node between access networks either supporting network-based mobility or not supporting network-based mobility in a packet-switched communication network comprising at least the mobile node, a mobile access gateway, a correspondent node and a mobile node's home agent, the method comprising the steps of:
   a) performing proxy route optimisation towards the correspondent node on behalf of the mobile node;
   b) performing handover from a current access network to a target access network;
   c) determining whether the proxy route optimisation is needed after the handover;
   d) in the affirmative, determining whether return-routability-based route optimisation or home agent-based route optimisation is to be carried out;
   e) if return-routability-based route optimisation is to be carried out, sending information regarding the proxy route optimisation to the mobile node by the mobile node's home agent; or
   f) if home agent-based route optimisation is to be carried out:
   generating and managing a route optimisation state in the mobile node by the mobile node's home agent; and
   updating the correspondent node's routing state with the mobile node's new location.

2. The method according to claim 1, wherein after step f) the following steps are carried out:
   g) if the correspondent node is attached to the same home agent as the mobile node, registering the mobile node's new location in the correspondent node by the home agent; or
   h) if the correspondent node's home agent is different from the mobile node's home agent, informing the correspondent node's home agent of the mobile node's new location by the mobile node's home agent; and
   updating a routing state in the correspondent node by the correspondent node's home agent.

3. The method according to claim 1, wherein after step e) the following step is carried out:
   updating the correspondent node's routing state by the mobile node.

4. The method according to claim 1, wherein after step c) the following step is carried out, if the proxy route optimization is not needed after the handover:
   deregistering the proxy route optimization with the correspondent node or the correspondent node's mobile access gateway by the mobile access gateway or the home agent.

5. The method according to claim 1, wherein routing states in mobile access gateways are updated by home agents.

6. The method according to claim 1, wherein signalling enabling communications between the mobile node, correspondent node, home agent and mobile access gateway is carried out using route optimization signalling.

7. The method according to claim 6, wherein integrity protection or encryption is used in the route optimization signalling.

8. A mobile node in a packet switched communications network further comprising a mobile access gateway, a correspondent node and a mobile node's home agent, the mobile node being adapted to handover between access networks either supporting network-based mobility or not supporting network-based mobility, the mobile node comprising:
   communication means adapted to perform handover between access networks either supporting network-based mobility or not supporting network-based mobility when the mobile node moves out of the current access network;
   route optimisation communications means adapted to receive route optimization information regarding the proxy route optimisation from the mobile node's home agent; and
   processing means to process the received route optimization information.

9. The mobile node according to claim 8 adapted to carry out the following step after processing the received route optimisation information:
   updating the correspondent node's routing state by the mobile mode.

10. A home agent in a packet switched communications network further comprising a mobile node, a correspondent node and a mobile access gateway, the mobile node being adapted to handover between access networks either supporting network-based mobility or not supporting network-based mobility, the home agent comprising:
   communication means adapted to support handover between access networks either supporting network-based mobility or not supporting network-based mobility when the mobile node moves out of the current access network;
   transmission means adapted to send route optimization signalling regarding the proxy route optimisation to the mobile node;
   management means adapted to generate and manage a route optimisation state in the mobile node, and to update the correspondent node's routing states; and
   decision means adapted to determine whether return-routability-based route optimisation or home agent-based route optimisation are to be carried out.

11. The home agent according to claim 10 adapted to carry out the following steps:
   if the correspondent node is attached to the same home agent as the mobile node, registering the mobile node's new location in the correspondent node by the home agent; or
   if the correspondent node's home agent is different from the mobile node's home agent, informing the correspondent node's home agent of the mobile node's new location by the mobile node's home agent; and
   updating a routing state in the correspondent node by the correspondent node's home agent.

12. A communication system comprising:
   a mobile node according to claim 8,
   a mobile access gateway comprising a mobile node, a correspondent node and a home agent, the mobile node being adapted to handover between access networks either supporting network-based mobility or not supporting network-based mobility, the mobile access gateway comprising communication means adapted to perform proxy route optimisation towards the correspondent node on behalf of the mobile node; and
   a home agent comprising a mobile node, a correspondent node and a mobile access gateway, the mobile node being adapted to handover between access networks either supporting network-based mobility or not supporting network-based mobility, the home agent comprising (i) communication means adapted to support handover between access networks either supporting network-based mobility or not supporting network-based mobility when the mobile node moves out of the current access network; (ii) transmission means adapted to send route optimization signalling regarding the proxy route optimisation to the mobile node; (iii) management means adapted to generate and manage a route optimisation state in the mobile node, and to update the correspondent node's routing states; and (iv) decision means adapted to determine whether return-routability-based route optimisation or home agent-based route optimisation are to be carried out.

13. A method for handover of a mobile node between access networks either supporting network-based mobility or not supporting network-based mobility in a packet-switched communication network comprising at least the mobile node, a correspondent node and a home agent, the method comprising the steps of:
   performing handover from a current access network to a target access network;
   determining whether route optimisation is needed after the handover; the affirmative,
   generating and managing a route optimisation state in the mobile node by the mobile node's home agent; and
   updating the correspondent node's routing state with the mobile node's new location.

14. The communication system according to claim 12, wherein the mobile access gateway is adapted to carry out the following step if the proxy route optimisation is not needed after the handover:
   deregistering the proxy route optimization with the correspondent node or the correspondent node's mobile access gateway by the mobile access gateway or the home agent.

* * * * *